July 5, 1955 S. C. NELSON 2,712,155
BEAD CONTROL APPARATUS FOR SHEET EXTRUDERS
Filed Aug. 31, 1953
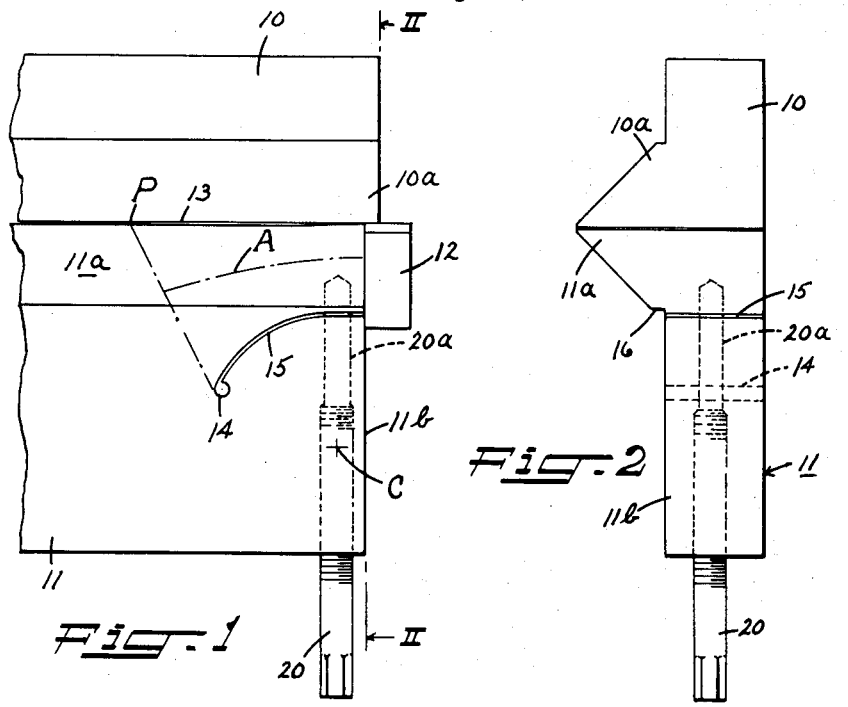
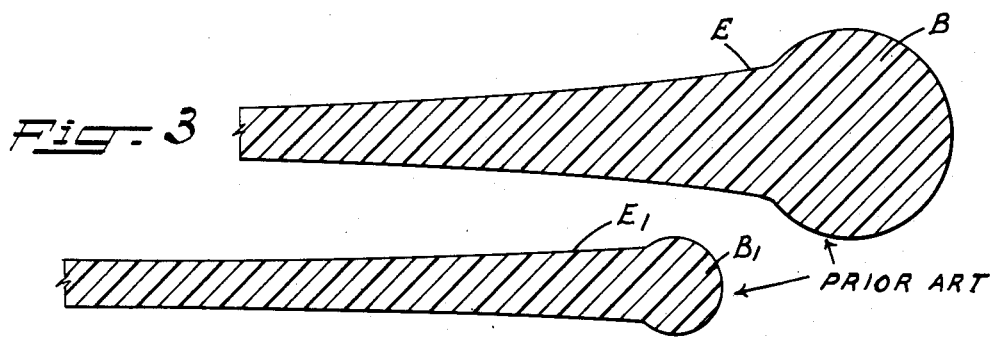
PRIOR ART
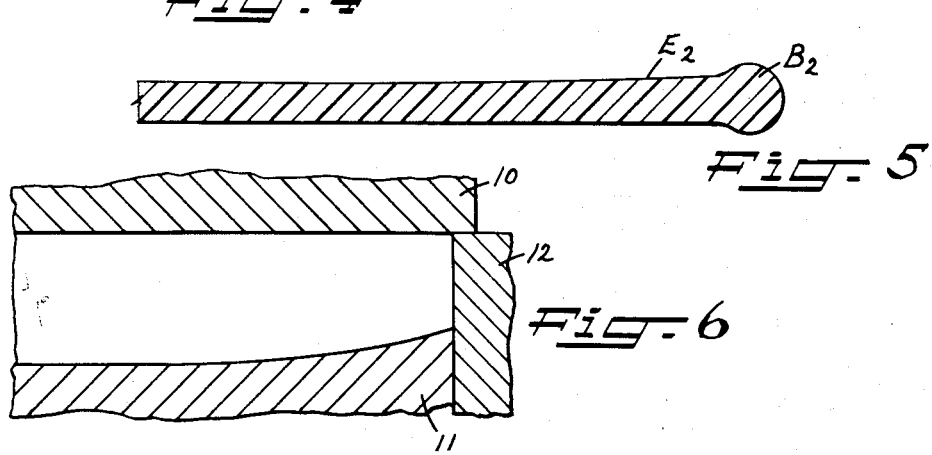

United States Patent Office 2,712,155
Patented July 5, 1955

2,712,155
BEAD CONTROL APPARATUS FOR SHEET EXTRUDERS

Seddon C. Nelson, Fredericksburg, Va., assignor to American Viscose Corporation, Wilmington, Del., a corporation of Delaware Application August 31, 1953, Serial No. 377,384

10 Claims. (Cl. 18—15)

This invention relates to slot-type extruders such as used in forming thin sheets of synthetic plastic material, for example, cellophane.

A serious problem in connection with extruding thin sheets or paper of this type is to provide uniform thickness across the sheet and particularly in the area adjacent the edges. It has been proposed to bow the blades forming the extrusion slot to overcome this difficulty, and such construction has met with limited success. The problem, however, of reducing or eliminating the bead and the thickened area leading up to the bead has not been satisfactorily solved.

When it is realized that the mean thickness of a sheet of cellophane paper, for example, is on the order of 0.00085 inch (8½ ten thousandths) and that the average bead in such a sheet of paper has a thickness of 0.0013 inch (13 ten thousandths), the difficulty of accurately controlling the thickness of the bead and maintaining the thickness of the sheet substantially uniform from edge-to-edge will be apparent. This problem is further complicated by the fact that a considerable volume of solvent vehicle must be extruded through the nozzle along with the actual sheet material. It is considered good practice, if not essential, to maintain the width of the slot ten times the final or dry thickness of the sheet, and the length of the slot twice the final width of the sheet. Great advantages can be achieved in the coating process if a reduction in bead thickness of even 25%–30% can be made. The present invention in practice reduces the thickness of the paper edge at least by 0.0002 inch (2 ten thousandths), which is the equivalent of nearly a 50% reduction in the excess thickness in the bead area, since the difference between the maximum thickness of 0.0013 inch (13 ten thousandths) and 0.00085 inch (8½ ten thousandths) the mean thickness, is 0.00045 (4½ ten thousandths). The invention also represents an important step in the art of casting cellulosic sheet material since it provides means for accurately and precisely shaping the extrusion slot at each terminus thereof and consequently controlling the cross-sectional area of the sheet edges.

A primary object, therefore, is to provide an improved blade for a plastic sheet-extruding nozzle which permits extremely accurate control of the marginal edge thickness, thereby reducing the bead and substantially eliminating undesired thickening in an area extending up to approximately two inches in from each edge of the sheet.

A further object of the invention is to provide a vernier adjustment at the edge of the blade of a sheet-extruding nozzle together with means for bending the blade adjacent the split edge.

A further object of the invention is to provide an improved nozzle construction for extruding sheet material.

A further object is to provide a blade for a cellophane sheet-extruding nozzle having a specially shaped and located kerf whereby one end of the blade can be accurately bowed without affecting the adjustment for the remainder of the blade.

A further object of the invention is to provide a shaped arcuate kerf in one of the extrusion nozzle blades which permits bending the terminus of the blade along a precalculated neutral axis to modify the shape of the extrusion slot.

Further objects will be apparent from the specification and drawings in which

Figure 1 is a fragmentary bottom view of a cellophane extruding nozzle assembly incorporating the present invention;

Figure 2 is an end view of the structure of Figure 1 as seen at II—II;

Figure 3 is a highly enlarged cross-section showing the thickened edge and bead such as frequently found in the prior art;

Figure 4 also illustrates the thickened edge and bead of what has heretofore been considered an average good sheet;

Figure 5 is a view similar to Figures 3 and 4 and on the same scale illustrating the results which can be uniformly obtained with the present invention; and Figure 6 is a highly enlarged fragmentary sectional detail showing one terminus of the extrusion slot.

The invention comprises essentially the provision of an arcuate kerf which is cut inwardly and downwardly in the lower blade adjacent each end of the cellophane sheet-extruding nozzle. An independent adjusting screw is threaded into the body of the blade and is positioned to bend the lip area of the blade in such a manner that a carefully controlled shape is imparted to the ends of the slot between the blades.

Referring now more particularly to the drawings, sheet-extruding apparatus of the type involved herein customarily comprises a fixed blade 10 which is held firmly in close spaced relation to an adjustable blade 11. Blade 10 is somewhat longer than blade 11, and the offset termini of the blades are effectively sealed by means of an end block 12 suitably clamped in place by brackets not shown. Prior practice employs a plurality of adjusting screws, not shown, to carefully maintain the desired spacing along the length of an extrusion slot or nozzle 13 formed between the lips 10a and 11a of blades 10 and 11. Where the thickness of the edge material of the cellophane is not of critical importance, satisfactory control of the sheet thickness can be achieved by turning one or more of these screws. However, where it is desired to build flat mill rolls, eliminate as much waste material as possible, and to avoid the necessity for time-consuming trimming and slitting operations, a reduction not only in the maximum bead thickness but in the gradually increasing thickened area adjacent the sheet edge is accomplished in accordance with the present invention.

For this purpose, I drill a hole 14 approximately 2½ inches up from the bottom edge of blade 11 and 2³⁄₁₆ inches in from the end face 11b of the blade. The periphery of this hole is tangentially connected to the end of the blade by means of an arcuate kerf 15 which is generated on a 2-inch radius from a center C located 2¹⁄₁₆ inches from the edge 16 of lip 11a and ⁷⁄₁₆ of an inch in from the end face 11b of blade 11. Such a shaped kerf provides additional curvature of the slot 13 in an area extending approximately 3½ inches in from the edge of the blade to a point indicated at P in Figures 1 and 6. The neutral bending axis is then formed approximately by the broken line A. An elongated adjusting screw 20 is threaded into the main body of blade 11 and has a nose 20a which bears against the inner face of the kerf 15 to impart the curvature described above.

The adjustment applied to the blade 11 in any case permits the shape of the slot 13 to be curved in just the proper manner to eliminate thickening of the marginal edge of the sheet and to reduce substantially the size of the bead. Comparable or satisfactory results could not be obtained by means of the standard adjusting screws even when more closely spaced at the ends of the blades because the "mike" of the sheet at the marginal edge was completely destroyed in all efforts to bring the edge adjustment into better relationship with the remainder of the sheet. While it was possible to close the nozzle 13 at its terminus to substantially eliminate the bead, this simply resulted in a distortion of the mike and a reduction in caliper of the sheet extending as far in from the edge as 3 to 3½ inches.

It is important to provide a shape for the nozzle which will offset the tendency of the extruded plastic material to form gradually thickened edges. This thickening is particularly marked or abrupt at the bead and then gradually tapers down to the desired controlled thickness of the sheet. Therefore, it is essential that the shape of the end of the slot compensate for this tapering whether it be gradual or abrupt. The bend in the blade should not be sharp nor should it be beyond a critical amount at any given point. Otherwise, the caliper of the sheet will be too thin. Furthermore, the optimum curvature of the kerf and its location may vary from blade-to-blade, and this is due in part to the nonuniform cross-section of the blade caused by lip 11a. On currently used apparatus, I have found that a straight kerf does not give satisfactory results, apparently because the bending in the blade is then concentrated in too short an area, thus giving a distorted mike rather than a corrected mike. In effect the kerf divides the end of the blade so that there are two extensions formed on the blade. The extension between the kerf and the slot is bent by the pressure exerted to widen the kerf. It will be understood, however, that it is not essential to have both extensions since the slot could be narrowed by exerting pressure on the arcuate extension from an independent point or mounting not associated with the blade at all.

Figures 3 and 4 are highly enlarged cross-sections of sheet edges obtained without the benefit of the present invention. Figure 3 shows an abnormal but not unusual condition in which the bead B is very large in diameter and the entire edge of the sheet tapers up to the large bead. This gives an entirely unsatisfactory and excessively large edge that must be trimmed or else the sheet will not form a mill roll that can be satisfactorily processed. Figure 4 illustrates a slightly better than average cross-section of a sheet edge not formed with the present kerfed blade. It will be noted that the bead $B_1$ is substantially smaller in diameter but the thickening of the edge just inside the bead taken at points E and $E_1$ ⅟₁₆ of an inch from the edge, is not correspondingly reduced. Figure 5 presents a very striking comparison when the present invention is utilized and properly adjusted. Not only is the diameter of the bead $B_2$ greatly reduced but there is only a very slight increment in the thickness of the sheet at point $E_2$ ⅟₁₆ of an inch from the edge. A further most important advantage is obtained because it is now possible to control variation within extremely fine tolerances so that in repeated tests the variations from a Figure 5 cross-section have been found to be imperceptible whereas Figures 3 and 4 are illustrative of variations consistently encountered heretofore. The following tabulation gives the actual thicknesses of the sheets shown in Figures 3–5 as measured and very strikingly compares the three products:

| | Diameter of Bead in Ten Thousandths of an Inch | Thickness of Sheet Measured ⅟₁₆ Inch From the Center of the Bead |
|---|---|---|
| Figure 3 (prior art, poor) | 40.0 | 24.1 |
| Figure 4 (prior art, good) | 16.8 | 13.5 |
| Figure 5 | 13.2 | 8.9 |

As a matter of strict accuracy the thicknesses tabulated above are measured from the center of the bead rather than the extreme edge of the sheet. Depending upon the radius of the bead, the distance from the extreme edge to the center of the bead may or may not be important.

It will, therefore, be understood that the present invention provides a greatly improved product and enables substantial elimination of waste and a reduction in manufacturing cost because it is not necessary to trim the edges of mill rolls in order to provide a sheet having uniform thickness from edge-to-edge. The results achieved are all the more startling when it is considered that the width of the slot 13 is ten times the thickness of the dried cellophane sheet and at a point ⅟₁₆ of an inch from the edge the sheet is substantially only 4 one-hundred thousandths of an inch (0.00004) thicker than the overall average thickness of the sheet which is on the order of 0.00085.

Having thus described my invention, I claim:

1. An extrusion nozzle assembly for forming sheet-like material comprising a relatively fixed nozzle blade, an adjustable nozzle blade secured in close spaced relation to said fixed blade and forming an extrusion slot therebetween, walls defining a kerf adjacent the terminus of said adjustable blade, and means for flexing the terminal end of said blade on one side of said kerf with respect to the body of the blade on the other side of said kerf.

2. Apparatus in accordance with claim 1 in which the neutral bending axis is arcuate.

3. An extrusion nozzle assembly for forming sheet-like material comprising a relatively fixed nozzle blade, an adjustable nozzle blade secured in close spaced relation to said fixed blade and forming an extrusion slot therebetween, walls defining an arcuate kerf adjacent the terminus of said adjustable blade, and means for flexing the terminal end of said blade on one side of said kerf with respect to the body of the blade on the other side of said kerf.

4. A nozzle assembly in accordance with claim 3 in which the kerf has a radius of substantially 2 inches.

5. A blade for extrusion nozzle assemblies of the type used in casting sheet material having a kerf beginning at the end of said blade and extending inwardly substantially 2 inches, and means for separating the blade at the kerf to bend the casting edge of the blade adjacent one end thereof.

6. A blade for extrusion nozzle assemblies of the type used in casting sheet material having a kerf beginning at the end of said blade and extending arcuately inward from the end of the blade, and means for spreading the blade at the kerf to arcuately bend the casting edge of the blade adjacent one end thereof.

7. An extrusion nozzle assembly for forming cellophane sheets and the like comprising a first relatively fixed nozzle blade, a second adjustable nozzle blade forming an extrusion orifice with the first blade, an arcuate kerf in one of said blades cut on a radius of substantially 2 inches and extending from the end of the blade inwardly and away from the extrusion orifice, and a set screw in said blade for springing the blade sections separated by the kerf.

8. Apparatus in accordance with claim 7 in which the centerline of the set screw is substantially at right angles to the orifice between the blades and substantially ⁷⁄₁₆ of an inch from the end of the blade.

9. Apparatus in accordance with claim 7 in which the stationary blade extends beyond the adjustable blade and having a block to seal the terminus of the orifice.

10. An extrusion nozzle assembly for paper-like sheets of material such as cellophane comprising a first blade, a complementary second blade supported in spaced relation to said first blade to form an elongated extrusion slot therebetween, walls defining an arcuate relief kerf extending inwardly from the end of one of said blades and curving away from the extrusion slot, and means for bending the terminal area of the kerfed blade towards the complementary blade to form an arcuate restriction at each terminus of the extrusion slot.

References Cited in the file of this patent

UNITED STATES PATENTS

| | | |
|---|---|---|
| 2,083,557 | Crane et al. | June 15, 1937 |
| 2,300,211 | Eberlin | Oct. 27, 1942 |